United States Patent

Wheeler et al.

(10) Patent No.: US 6,953,410 B2
(45) Date of Patent: Oct. 11, 2005

(54) AUTOMATIC SELECTION OF START GEAR

(75) Inventors: Robert Stanley Wheeler, Preston (GB); Alfred John Richardson, Knutsford (GB); Martin Fowler, LYMM Cheshire (GB); Keith Wright, Preston (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/333,154

(22) PCT Filed: Jul. 24, 2001

(86) PCT No.: PCT/IB01/01322

§ 371 (c)(1),
(2), (4) Date: Sep. 2, 2003

(87) PCT Pub. No.: WO02/08640

PCT Pub. Date: Jan. 31, 2002

(65) Prior Publication Data

US 2004/0025617 A1 Feb. 12, 2004

(30) Foreign Application Priority Data

Jul. 26, 2000 (GB) .............................................. 0018184

(51) Int. Cl.[7] .............................................. B60K 41/04
(52) U.S. Cl. ........................ 475/115; 475/900; 475/901
(58) Field of Search ................................ 477/900, 901, 477/79, 97, 115, 120

(56) References Cited

U.S. PATENT DOCUMENTS

| 4,854,194 | A | * | 8/1989 | Kaneko et al. | ................ 477/97 |
| 5,406,862 | A | | 4/1995 | Amsallen | |
| 5,415,604 | A | * | 5/1995 | Bates et al. | .................... 477/78 |
| 5,416,700 | A | * | 5/1995 | Bates et al. | .................. 477/115 |
| 6,394,931 | B1 | * | 5/2002 | Genise | ......................... 477/97 |
| 6,412,361 | B1 | | 7/2002 | Wolf et al. | |
| 6,519,522 | B1 | * | 2/2003 | Wolf et al. | .................. 477/901 |

FOREIGN PATENT DOCUMENTS

| DE | 19839837 A1 | 3/2000 |
| DE | 19839838 A1 | 3/2000 |
| DE | 19946334 A1 | 4/2000 |

OTHER PUBLICATIONS

International Search Report, 5 pages.
Delphion English Abstract for DE19839837A1 and DE19946334A1.

* cited by examiner

*Primary Examiner*—Roger Pang
(74) *Attorney, Agent, or Firm*—Rader, Fishman & Grauer PLLC

(57) ABSTRACT

An automated clutch system for transferring torque from an engine to a change gear transmission is connected to a processing unit which uses various input parameters to calculate the grade on which the vehicle is operating and its current weight to determine an appropriate start gear to minimise clutch slip when the vehicle is launched from rest.

6 Claims, 2 Drawing Sheets

Flow Chart of Operation

Flow Chart of Operation

AUTOMATIC SELECTION OF START GEAR

This invention relates to vehicle transmission systems and improvements thereto.

BACKGROUND OF INVENTION

On a vehicle fitted with a manually operated transmission and clutch system, the driver operates the clutch pedal and selects an appropriate starting gear. An experienced driver will select an appropriate gear which will enable the vehicle to be started smoothly from rest without undue slipping of the clutch and without the subsequent need to make unnecessary gear shifts as the vehicle speed increases. An experienced driver will base the selection of start gear on his mental estimates of the vehicle weight, the vehicle performance, road conditions and gradient. If a gear is selected which is too high for the current weight and gradient then to allow the vehicle to pull away smoothly the driver will slip the clutch until the vehicle speed is high enough to allow complete engagement of the clutch. Clutch slip results in wear on the clutch, the more often the driver slips the clutch the lower the clutch life.

A conventional automatic transmission is normally a automatic transmission uses a torque converter and an epicyclic gear train. An automated mechanical transmission (AMT) is normally considered to be a stepped gear transmission and will have a clutch device between it and the engine to selectively connect the engine to the transmission. The clutch device is normally a friction type device, rather than a torque converter. An AMT normally includes means for controlling the selection of gear ratio. Operation of the clutch can be by pedal or by an automated means. An AMT is normally provided with a manual override control for selecting or holding a ratio. With an AMT the selection of a start gear can be controlled to give optimum start performance and minimise clutch slip time.

Whilst clutch slip can be minimised by always starting in $1^{st}$ gear, such an implementation would often result in a large number of unnecessary gear shifts and would be tedious and unacceptable for the driver. Fuel efficiency would also be adversely affected.

On current AMT implementations, the selection of a starting gear is still made by the driver by operation of a selector switch. Such a switch will normally be in the form of a selector lever mounted on the steering column or beside it, or a dash panel mounted switch and is also used for gear selection or overriding the gear selected/determined to be appropriate by the CPU. These switches can allow the driver to select a less than optimum gear for starting and so possibly reduce clutch life. Often an AMT will have a pre-programmed start gear which may be pre-programmed into the control system of the AMT. Alternatively, and frequently, it may be set at the beginning of every journey or even re-set during the journey. A disadvantage of such systems is that they are relatively inflexible in that they do not take account of changes in road conditions or vehicle weight due to a loading or unloading stop.

It is possible on some applications of the current AMT systems to use a central processing unit (CPU) to calculate (or measure using sensors, which supply information to the CPU) the gradient of the road, the gross vehicle weight (GVW). Using these values of gradient and vehicle weight it is possible to calculate an optimum starting gear for the system in the prevailing conditions and select this independently of the driver. The benefits of this system are to protect the clutch and transmission from starting in too high or too low a gear for the current conditions, so allowing a longer clutch life and reduced abuse of the vehicle drive train.

The system is also simplified for the driver. He does not need to select a starting gear, although an override system may be included if it is considered appropriate.

SUMMARY OF INVENTION

According to the present invention there is provided an automated transmission system for a vehicle, the transmission system including a change gear transmission system and a vehicle starting device, the starting device being capable of transferring torque from the engine to the transmission in a range of from zero torque transfer to a transfer of maximum available engine torque, the transmission system including at least one processing unit, a plurality of sensors whose outputs are supplied as input to the processing unit, the processing unit using the sensors inputs to determine values of current gross vehicle weight and of the gradient on which the vehicle is operating in order to determine an optimum start gear ratio, said optimum start gear ratio will be the highest start gear possible to provide starting device slip of less than a pre-determined amount and a minimum number of gear shifts needed to reach a target road speed

BRIEF DESCRIPTION OF DRAWINGS

The invention will now be described with reference to the following figures in which.

DETAILED DESCRIPTION

Figure 1:
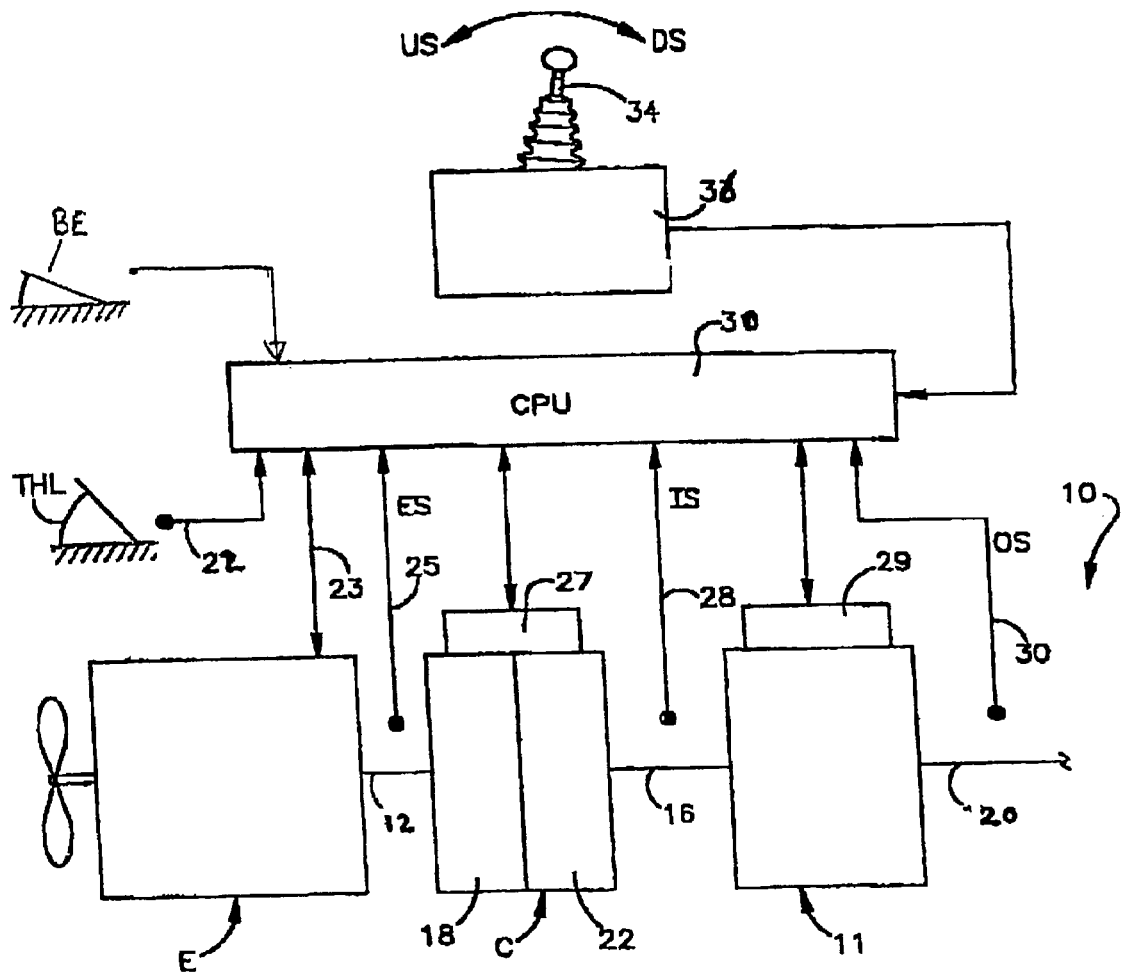
FIG. 1 shows a schematic view of a transmission system.

A transmission system 10 includes an engine E having an output shaft 12 connected to a clutch C, which is in turn connectable to an input shaft 16 of a change gear transmission 11. The transmission 11 is has an output shaft 20 connected to the drive wheels (not shown) of the vehicle.

The system is controlled by a CPU 30, which preferably is a single processing unit, but alternatively could be a plurality of processing units distributed processing units. In such circumstances the processing units may be located on the transmission, in the vehicle cab, on the engine, on the chassis or any combination of these. The transmission will normally have a number of modes in which it can operate, including manual and automatic. There may be additional functions to enable the shift points to be adjusted to suit the prevailing conditions.

The engine power demanded by a driver is signaled by THL 22, whose output signal is sent to the CPU 30. The CPU 30 then communicates the demanded power as an output signal to the engine E along link 23. The driver will also be provided with a gear ratio selector lever 34, usable to select a transmission ratio or to override the selection made by the CPU if the transmission is in automatic mode. Operation of the clutch is controlled by the CPU whose control signals are sent to a clutch operator 27. Operation of the transmission will be by known means not forming a part of this invention. The gear ratio selector lever 34 operates a set of contacts in unit 36 to provide an output signal to the CPU 30. The selector lever 34 is used by the driver to select a gear ratio or to override the ratio selected by the transmission. Additional inputs to the CPU are from sensors ES, IS and OS which measure engine speed, transmission inputs shaft speed and transmission output shaft speed respectively. Output shaft speed can be used to determine vehicle speed in known manner.

The CPU will receive inputs of signals of ES, IS and OS from the appropriate sensors. The transmission controller 29 will also supply information about the currently engaged gear ratio (GR). From this information, it is possible to calculate GVW in known manner. Another source of GVW information could be the suspension system if it is of the air suspension type.

If the vehicle weight is known and the engine performance characteristics are known, it is possible to determine the gradient upon which the vehicle is operating. If this information is known, it is then possible to determine an optimum start gear ratio for the prevailing conditions. This optimum start gear ratio will be the ratio which will result in a minimum amount of clutch slip during the launch of the vehicle from the rest to the clutch fully engaged condition. The preference is to use a higher gear as possible for starting purposes. This improves fuel efficiency by reducing the number of subsequent gear changes necessary. A reduced number of gear changes is to be preferred by the operator and leads to a more comfortable ride, providing the engine is not labouring too hard.

However, if the gear ratio selected is too high then it will be a relatively long time before the engine is connected directly with the transmission via the clutch in a non-slipping way. Prolonged periods of slip in a friction clutch lead to reduced clutch life. In the case of a hydraulic torque converter prolonged periods of slip lead to reduced fuel efficiency.

If the engagement period is too short then the drive train "snatches" with an abrupt engagement and that is neither comfortable for the operator nor good for the life of the other components of the vehicle. Acceptable range of times for the clutch to slip vary between 0.25 and 5 seconds and are heavily dependant on the vehicle, the conditions at the time, such as gross vehicle weight, grade, gear ratio selected and the driver demands. The driver demands will affect the slip time depending upon whether the driver wishes to move off quickly or more smoothly and gently. The preferred values lie between 0.5 and 1.5 seconds.

The normally known parameters are engine speed, vehicle speed, engaged gear ratio, but if the gross vehicle weight and the gradient is also known, then an optimum starting gear value can be calculated. Clearly, the optimum ratio will be higher if the vehicle is going to set off in a downhill direction than if it is on a level or uphill gradient. If it is on an uphill gradient the gear will be selected according to the steepness of the gradient.

In a heavy vehicle operating at a GVW of say, 40 tonnes or more (approx. 80000 lbs.), and fitted with a transmission having 12 or 16 forward ratios, depending upon load and gradient, a normal start gear would be between $3^{rd}$ and $7^{th}$ gear depending upon the GVW and gradient For a medium weight vehicle operating at up to 36 tonnes (approx. 72000 lbs.) and fitted with a six or nine speed transmission, the normal start ratio will be between $2^{nd}$ and $4^{th}$ gear, again depending upon GVW and gradient.

Figure 2:
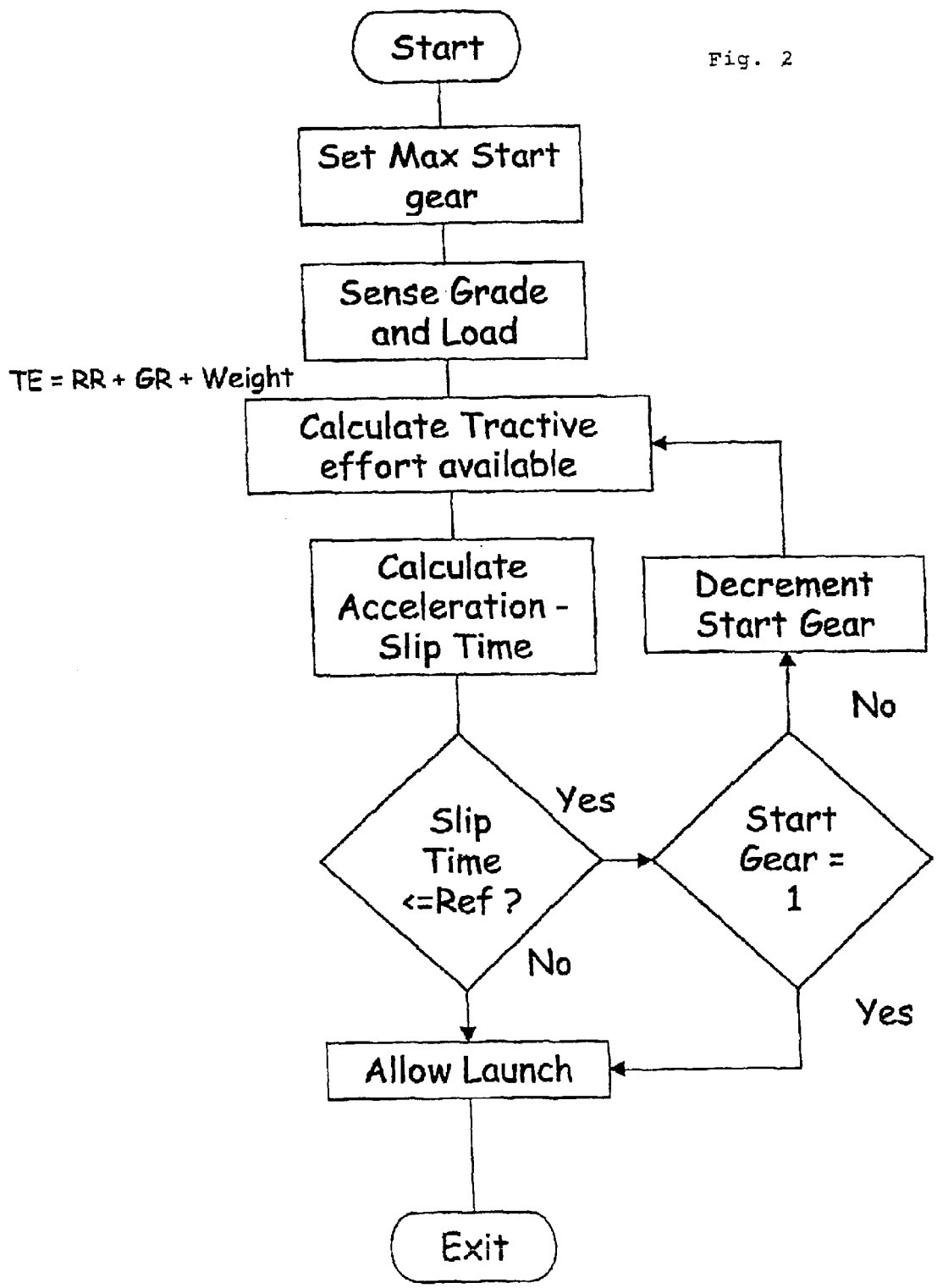
FIG. 2 shows a flow chart detailing operation of the system of the present invention.

A preferred method of determining the optimum start gear is shown in the flow chart of FIG. 2. In this example the maximum start gear can be programmed into a CPU memory and selected to suit the particular transmission type and number of the ratios. As indicated above it could be $3^{rd}$ or $5^{th}$. The grade on which the vehicle is operating is sensed, as is the load. As explained above, the information can be calculated by methods described or read from the J1939 data link.

Other information available either in the form of stored data or information read from the J1939 link can be used to calculate the tractive effort available. Simply expressed the Tractive Effort TE is calculated as a function:

$$TE=f(RR+GR+GVW)$$

Where RR is rolling resistance
GR is grade
GVW is gross vehicle weight

Once the tractive effort available has been determined it is then possible to calculate an estimated acceleration slip time, that is the time during which it is estimated the clutch will slip as the vehicle is accelerated to the point at which the clutch can be fully engaged.

As mentioned above, there is a preferred maximum value for slip time and so this value of say 1.5 seconds can be programmed into the CPU memory as the reference time. If the result of the calculation of the acceleration slip time, a time of greater than the predetermined reference value is found then the start gear can be decreased by 1 and the calculation process repeated with the lower gear value. This cycle can be repeated until the acceleration slip time falls within acceptable limits. At that time the gear ratio calculated can be engaged by the automated transmission and the vehicle launch is allowed.

As mentioned above with very short clutch slip times there is a risk of "transmission snatch", which is not pleasant for the driver or good for the vehicle. The CPU can also be programmed to conduct this test to ensure the slip time is not below a predetermined minimum value. However, certain exceptions may be allowed, such as when the vehicle is setting off down a steep hill, and so the amount of torque being transmitted through the clutch will be very low with a low.

Under certain conditions it is possible that the acceleration slip time will be greater than the predetermined reference value (normally permitted time), such as when needing to start on a very steep incline with a fully loaded vehicle. In such circumstances there may be little alternative but to allow the launch in $1^{st}$ gear. However, the vehicle will normally be provided with other clutch and drive-line protection devices which can be used to ensure the clutch does not overheat and is not damaged. Examples of such devices are temperature sensors and/or vibration sensors.

It can be seen that by selecting an optimum start ratio the number of shifts needed to reach a steady state speed (not necessarily maximum) could be reduced by up to four shifts. Such a reduction will reduce driver fatigue as well as fuel consumption. Clearly, there will be reduced clutch wear, however it is very difficult to make realistic estimates of the extent to which clutch life will be extended.

It can be seen that by selecting an optimum start ratio the number of shifts needed to reach a steady state speed (not maximum) could be reduced by up to four shifts. Such a reduction will reduce driver fatigue as well as fuel consumption. Clearly, there will also be reduced clutch wear.

What is claimed is:

1. An automated transmission system for a vehicle, the transmission system locatable between a prime mover and vehicle drive wheels, including a change gear transmission, a clutch device, the clutch device being capable of transferring torque from the prime mover to the transmission in a range of from zero torque transfer to a transfer of maximum torque available from the prime mover, the transmission system including:

at least one processing unit, a plurality of sensors whose outputs are supplied as input to the processing unit, the processing unit determining values of: i) current gross vehicle weight end ii) gradient on which the vehicle is operating, in order to determine an optimum start gear ratio, said optimum start gear ratio being the highest start gear possible to provide clutch slip for an amount of time lasting less than a predetermined time, but not below a predetermined minimum value.

2. An automated transmission system according to claim 1 in which the sensors are any one or more of throttle pedal position (THL), engine speed, input shaft speed (IS), output shaft speed (OS), gear ratio (GR).

3. An automated transmission system according to claim 1 in which the clutch device is a friction clutch.

4. An automated transmission system for a vehicle according to claim 1 in which the gear ratio determined by the CPU provides for a clutch slip time to be less than a predetermined maximum and requires a minimum number of gear shifts needed to reach a target road speed.

5. An automated transmission system according to claim 2 in which the gear ratio determined by the CPU provides for a clutch slip time to be less than a predetermined.

6. A method of calculating an optimum gear ratio for a vehicle fitted with an automated transmission system, the transmission system locatable between a prime mover and vehicle drive wheels, including a change gear transmission, a clutch device, the clutch device being capable of transferring torque from the prime mover to the transmission in a range of from zero torque transfer to a transfer of maximum torque available from the prime mover, the transmission system including:

at least one processing unit, a plurality of sensors whose outputs are supplied as input to the processing unit, the method including determining values of: i) current gross vehicle weight and ii) the gradient on which the vehicle is operating, the processing unit using the values to determine an optimum start gear ratio, said optimum start gear ratio will be the highest start gear possible providing clutch slip for an amount of time lasting less than a predetermined time, but not below a predetermined minimum value.

* * * * *